United States Patent [19]
Wakabayashi

[11] Patent Number: 5,714,026
[45] Date of Patent: Feb. 3, 1998

[54] METHOD OF MAKING A PNEUMATIC TIRE

[75] Inventor: Noboru Wakabayashi, Kobe, Japan

[73] Assignee: Sumitomo Rubber Industries, Ltd., Hyogo, Japan

[21] Appl. No.: 645,697

[22] Filed: May 14, 1996

Related U.S. Application Data

[63] Continuation of Ser. No. 154,507, Nov. 19, 1993, abandoned.

[30] Foreign Application Priority Data

Nov. 20, 1992 [JP] Japan ..................... 4-333810

[51] Int. Cl.$^6$ ............. B29D 30/06; B60C 11/03; B60C 11/12
[52] U.S. Cl. ............. 156/110.1; 152/209 R; 152/DIG. 3
[58] Field of Search ............. 156/110.1; 152/209 R, 152/209 A, 209 D, DIG. 3

[56] References Cited

U.S. PATENT DOCUMENTS

| | | | |
|---|---|---|---|
| 3,674,077 | 7/1972 | Verdier | 152/209 R |
| 4,416,317 | 11/1983 | Caretta | 152/209 R |
| 4,730,654 | 3/1988 | Yamashita et al. | 152/209 R |
| 4,884,606 | 12/1989 | Matsuda et al. | 152/209 R |
| 4,913,208 | 4/1990 | Anderson et al. | 152/209 R |
| 4,962,801 | 10/1990 | Tsuda . | |
| 5,088,536 | 2/1992 | Graas et al. | 152/209 R |
| 5,135,038 | 8/1992 | Graas et al. | 152/209 R |
| 5,240,053 | 8/1993 | Baumhöfer et al. | 152/209 R |

FOREIGN PATENT DOCUMENTS

| | | | |
|---|---|---|---|
| 0321384 | 6/1989 | European Pat. Off. . | |
| 243403 | 10/1991 | Japan | 152/209 D |
| 4024104 | 1/1992 | Japan | 152/209 R |
| 2178380 | 11/1987 | United Kingdom . | |

OTHER PUBLICATIONS

S.K. Clark, *Mechanics of Pneumatics Tires*, Aug. 1, 1981; U.S. Department of Transportion, Washington D.C.

Matyja, Frank, "Tread Design and Belt Angle Effect on Residual Aligning Torque", SAE Technical Paper Series, Feb. 1987.

*Primary Examiner*—Steven D. Maki

[57] ABSTRACT

The present invention relates to a method of setting a tire tread pattern provided with grooves at angles with respect to a vehicle's direction of travel that enables the vehicle to run straight on a sloping road with good maneuverability. The invention also relates to a method for selecting a vehicle of a given weight that is equipped with a tire having a set tread pattern for preventing skewing.

1 Claim, 1 Drawing Sheet

METHOD OF MAKING A PNEUMATIC TIRE

This application is a continuation of application Ser. No. 08/154,507 filed on Nov. 19, 1993, now abandoned.

BACKGROUND OF THE INVENTION

To insure good water drainage, many roads on which vehicles travel are constructed with a small inclination from the center to either edge of the road. Vehicles running on such roads are subjected to a "skew force" which causes them to drift from the center of the road toward either edge following the slope. If a driver removes his hands from the steering wheel, the vehicle will deviate in a sideways direction from the initial straight line of travel. This often causes "skewing" of the vehicle.

To solve this problem, attempts have been made to control the direction of breaker attachments and/or the stiffness of the breaker in such a way that the residual cornering force (RCF) develops in a direction for cancelling the effect of the slope of the road surface. However with tire structural designs that can be adopted on conventional vehicles, marked changes in RCF are not possible and the approach described above has often proved to be unsatisfactory. The problem is further complicated by the fact that the skew force varies greatly with the vehicle weight.

SUMMARY OF THE INVENTION

It is thus an object of the present invention to provide a method for selecting, according to the vehicle weight, a suitable tire tread pattern that enables a vehicle to run in a straight direction on a sidewise sloping road with better maneuverability. The method comprises equipping a vehicle with a tire that is suited for the weight of the vehicle and which produces an inherent residual cornering force to counteract skewing.

Another object of the present invention is to provide a vehicle whose weight is appropriate for a tire having a tread pattern selected to compensate for the skew force.

In accordance with the first aspect of the present invention, there is provided a method for selecting a tire tread pattern according to vehicle weight. The method is characterized by equipping a vehicle weighing M (kg) with a tire that has grooves and sipes at angles of no more than 90 degrees with respect to the revolving axis of the tire and in which the area ranging from the center to either edge of the road contacting surface is divided into three equal portions; a crown portion, a middle portion and a shoulder portion. The center being defined in association with the direction in which the road contacting surface of the tire rotates and the edge being defined as the axial edge of the road contacting surface.

The tire has a tread pattern with a pattern index PI that satisfies the following relationship with respect to the residual cornering force (RCF) inherent in the tread pattern:

$$0.9 \leq (60 \cdot PI + 900)/M \leq 1.1$$

where $$PI = (\Delta RCF_{CR} + \Delta RCF_{SH}) + (\Delta RCF_{CR1} + \Delta RCF_{SH1}).$$

The term $(\Delta RCF_{CR} + \Delta RCF_{SH})$ represents the residual cornering force developed by grooves in the tread pattern, which is determined by the following equations:

Crown portion: $\Delta RCF_{CR} = \Sigma(-0.020 \cdot m \cdot \alpha \cdot \Theta)$ Shoulder portion: $\Delta RCF_{SH} = \Sigma(0.047 \cdot n \cdot \beta \cdot \delta)$ The term $(\Delta RCF_{CR1} + \Delta RCF_{SH1})$ represents the residual cornering force developed by sipes in the tread pattern and is determined-by the following equations:

Crown portion: $\Delta RCF_{CR1} = \Sigma(-0.020 \cdot m_1 \cdot \alpha_1 \cdot \Theta_1)$ Shoulder portion: $\Delta RCF_{SH1} = \Sigma(0.021 \cdot n_1 \cdot \beta_1 \cdot \delta_1)$ The symbols used in the four equations have the following meanings:

m: the number of grooves in the crown portion of the road contacting surface of the tire;

n: the number of grooves in the shoulder portion of the road contacting surface of the tire;

$\alpha$: the ratio of the axial length of a groove in the crown portion of the road contacting surface of the tire to the length of the crown portion;

$\Theta$: the angle a groove in the crown portion of the road contacting surface of the tire forms with the axial direction of the tire;

$\beta$: the ratio of the axial length of a groove in the shoulder portion of the road contacting surface of the tire to the length of the shoulder portion;

$\delta$: the angle a groove in the shoulder portion of the road contacting surface of the tire forms with the axial direction of the tire;

$m_1$: the number of sipes in the crown portion of the road contacting surface of the tire;

$n_1$: the number of sipes in the shoulder portion of the road contacting surface of the tire;

$\alpha_1$: the ratio of the axial length of a sipe in the crown portion of the road contacting surface of the tire to the length of the crown portion;

$\Theta_1$: the angle a sipe in the crown portion of the road contacting surface of the tire forms with the axial direction of the tire;

$\beta_1$: the ratio of the axial length of a sipe n the shoulder portion of the road contacting surface of the tire to the length of the shoulder portion; and $\delta_1$: the angle a sipe in the shoulder portion of the road contacting surface of the tire forms with the axial direction of the tire.

In the present invention, a tire is selected in accordance with the vehicle weight M such that it has a tread pattern with a pattern index PI that can provide a residual cornering force (RCF) inherent in the appropriate tread pattern. A vehicle equipped with this tire has improved maneuverability in running straight on a sidewise sloping road while experiencing only limited "skew".

In accordance with the second aspect of the present invention, a method is provided for selecting a vehicle having a weight M (kg) and which is equipped with a tire having a tread pattern whose pattern index PI as defined hereinabove satisfies the following relationship with the vehicle weight M:

$$0.9 \leq (60 \cdot PI + 900)/M \leq 1.1$$

In the present invention, a selected vehicle weighing M (kg) is equipped with a tire having a tread pattern whose pattern index PI satisfies the specified relationship with the vehicle weight M and this also insures improved maneuverability in running straight so that the vehicle can travel on a sidewise sloping road in a stable manner while experiencing only limited "skew".

BRIEF DESCRIPTION OF THE DRAWINGS

The following detailed description of the invention will be more readily understood when considered together with the accompanying drawings wherein.

DETAILED DESCRIPTION OF PREFERRED EMBODIMENT

An embodiment of the present invention is described below with reference to the accompanying drawings.

In particular, an embodiment of the present invention is a method which comprises:

determining a vehicle weight M of a vehicle; and making a tire having a tread with a road contacting surface, the tread including a crown portion located adjacent to the tire equator, a shoulder portion located adjacent to an edge of the tread and a middle portion located between the shoulder portion and crown portion, the tread having a tread pattern, the tread pattern including axial grooves and sipes in each of the portions, wherein in said making step, said tread pattern of said tread is formed based on the vehicle weight M of the vehicle which is determined in said determining step such that said tread pattern of the tread has a pattern index PI which satisfies the following condition:

$$0.9 \leq (60 \cdot PI + 900)/M \leq 1.1$$
$$PI = (\Delta RCF_{CR} + \Delta RCF_{SH}) + (\Delta RCF_{CR1} + \Delta RCF_{SH1})$$

$$\Delta RCF_{CR} = \sum_{i=0}^{m} (-0.020 \cdot m \cdot \alpha(i) \cdot \Theta(i))$$

$$\Delta RCF_{SH} = \sum_{i=0}^{n} (0.047 \cdot n \cdot \beta(i) \cdot \delta(i))$$

$$\Delta RCF_{CR1} = \sum_{i=0}^{m_1} (-0.020 \cdot m_1 \cdot \alpha_1(i) \cdot \Theta_1(i))$$

$$\Delta RCF_{SH1} = \sum_{i=0}^{n_1} (0.021 \cdot n_1 \cdot \beta_1(i) \cdot \delta_1(i))$$

where

- m: the total number of grooves in the crown portion of the road contacting surface of the tire;
- n: the total number of grooves in the shoulder portion of the road contacting surface of the tire;
- $\alpha$: the ratio of the axial length of a groove in the crown portion of the road contacting surface of the tire to the width of the crown portion;
- $\Theta$: the angle the groove in the crown portion of the road contacting surface of the tire forms with the axial direction of the tire;
- $\beta$: the ratio of the axial length of a groove in the shoulder portion of the road contacting surface of the tire to the width of the shoulder portion;
- $\delta$: the angle the groove in the shoulder portion of the road contacting surface of the tire forms with the axial direction of the tire;
- $m_1$: the total number of sipes in the crown portion of the road contacting surface of the tire;
- $n_1$: the total number of sipes in the shoulder portion of the road contacting surface of the tire;
- $\alpha_1$: the ratio of the axial length of a sipe in the crown portion of the road contacting surface of the tire to the width of the crown portion;
- $\Theta_1$: the angle the sipe in the crown portion of the road contacting surface of the tire forms with the axial direction of the tire;
- $\beta_1$: the ratio of the axial length of a sipe in the shoulder portion of the road contacting surface of the tire to the width of the shoulder portion; and
- $\delta_1$: the angle the sipe in the shoulder portion of the road contacting surface of the tire forms with the axial direction of the tire.

Figure 1:
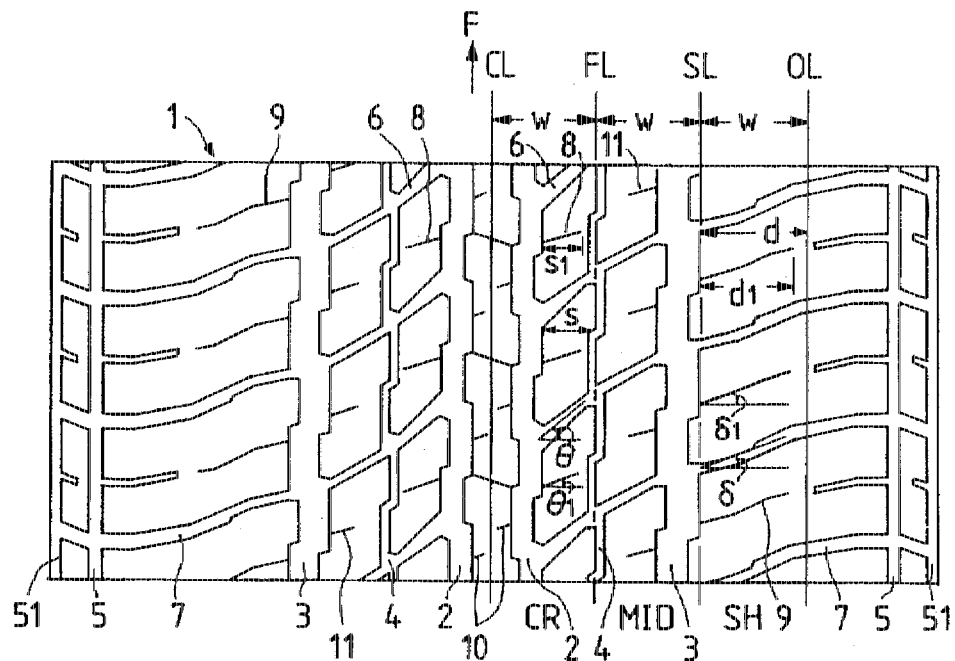
FIG. 1 is an illustration of a tire tread pattern designed in accordance with one embodiment of the present invention.

FIG. 1 shows a tread pattern formed on the surface of a tire which is generally indicated by 1. The pattern includes a first pair of zigzag main grooves 2 that are located in the central portion of the tread in the direction of the tire's width and circumferentially around the tire, namely, in the tire rotating direction (indicated by arrow F). The first pair of main grooves 2 are generally parallel to each other at a comparatively small space. A second pair of zigzag main grooves 3 are spaced outward from the first main grooves 2 by a predetermined width towards either side of the tire in the direction of the tire's width and extend circumferentially around the tire. A first pair of zigzag subgrooves 4 extend between the first main grooves 2 and the second main grooves 3. The subgrooms are comparatively thinner than said main grooves 2 and 3. A second pair of linear subgrooves 5 and 51 are formed near the edges of the tread 1 and extend circumferentially around the tire. The first angled grooves 6 each extend across the first subgroove 4 to be connected at opposite ends to a first main groove 2 and a second main groove 3 at an angle of $\Theta$ with respect to the axial direction of the tire. The second angled grooves 7, each being connected at opposite ends to a second main groove 3 and a second subgroove 5, are formed at an angle of $\delta$ with respect to the axial direction of the tire. Each of the first sipes 8 extends from the side wall of the first main grooves 2 outward in the axial direction of the tire at an angle of $\Theta_1$. Each of the second sipes 9 extends from the side wall of either second main groove 3 and outward in the axial direction of the tire are formed at an angle of $\delta_1$. Auxiliary sipes 10 and 11 extend from the side walls of the first and second main grooves 2 and 3, respectively, towards the center of the tire tread.

The center of the road contacting surface of the tread 1 which in most cases coincides with the center line of the tread is designated by CL in FIG. 1. The area between CL and either edge of the road contacting surface in the axial direction of the tire as designated by OL is divided into three equal portions by lines FL and SL by a distance w. The three equal portions are defined as (in order from the center of the road contacting surface CL) a crown portion CR, a middle portion MID and a shoulder portion SH.

We next describe the residual cornering force RCF that is developed by the tread pattern in the road contacting surface of the tire.

As far as the road contacting surface of the tire is concerned, those parts of the patterns which contribute to the increase in the residual cornering force RCF are not the first main grooves 2, the second main grooves 3 or the first subgrooves 4 that extend circumferentially around the tire. Instead it is the grooves and sipes that extend axially. Stated more specifically, the contributing parts are the grooves and sipes that are provided in the crown portion CR and the shoulder portion SH which extend axially outward. The grooves and sipes located in the middle portion and the MID portion do not significantly contribute to adjustment of the RCF.

As shown in FIG. 1, the first angled grooves 6 in the crown portion CR that slope upward to the right of the center line CL have a negative (−) effect on the increase of the residual cornering force RCF. The amount of contribution $\Delta RCF_{CR}$ is calculated by the following equation:

$$\Delta RCF_{CR} = \Sigma(-0.020 \cdot m \cdot \alpha \cdot \Theta)$$

where m: the number of grooves 6 in the crown portion CR;

α: the ratio of the axial length s of a groove 6 to the width w of the crown portion CR; and Θ: the angle formed by a groove 6 with respect to the axial direction of the tire, with the counterclockwise direction taken as positive.

The second angled grooves 7 in the shoulder portion SH that slope upward to the right have a positive (+) effect on the increase of the residual cornering force RCF. The amount of contribution $\Delta RCF_{SH}$ is calculated by the following equation:

$$\Delta RCF_{SH} = \Sigma(0.047 \cdot n \cdot \beta \cdot \delta)$$

where n: the number of grooves 7 in the shoulder portion SH;

β: the ratio of the axial length d of a groove 7 to the width w of the shoulder portion SH; and δ: the angle formed by a groove 7 with respect to the axial direction of the tire, with the counterclockwise direction taken as positive.

The first sipes 8 in the crown portion CR slope upward to the right and have a negative (−) effect on the increase of the residual cornering force RCF. The amount of contribution $\Delta RCF_{CR1}$ is calculated by the following equation:

$$\Delta RCF_{CR1} = \Sigma(-0.020 \cdot m_1 \cdot \alpha_1 \cdot \Theta_1)$$

where $M_1$: the number of sipes 8 in the crown portion CR;

$\alpha_1$: the ratio of the axial length $s_1$ of a sipe to the width w of the crown portion CR; and $\Theta_1$: the angle formed by a sipe 8 with respect to the axial direction of the tire, with the counterclockwise direction take as positive.

The second sipes 9 in the shoulder portion SH that slope upward to the right have a positive (+) effect on the increase of the residual cornering force RCF. The amount of contribution $\Delta RCF_{SH1}$ is calculated by the following equation:
$$\Delta RCF_{SH1} = \Sigma(0.021 \cdot n_1 \cdot \beta_1 \cdot \delta_1)$$

where $n_1$: the number of second sipes 9 in the shoulder portion SH;

$\beta_1$: the ratio of the axial length $d_1$ of a second sipe 9 to the width w of the shoulder portion SH; and $\delta_1$: the angle formed by a second sipe 9 with respect to the axial direction of the tire, with the counterclockwise direction taken as positive.

On the basis of the thus calculated amounts of contribution to the residual cornering force RCF, the pattern index PI of the tread pattern is calculated by the following equation:

$$PI = (\Delta RCF_{CR} + \Delta RCF_{SH}) + (\Delta RCF_{CR1} + \Delta RCF_{SH1})$$

where $(\Delta RCF_{CR} + \Delta RCF_{SH})$ represents the amount of contribution made by the angled grooves and $(\Delta RCF_{CR1} + \Delta RCF_{SH1})$ the amount of contribution made by the sipes.

Figure 2:
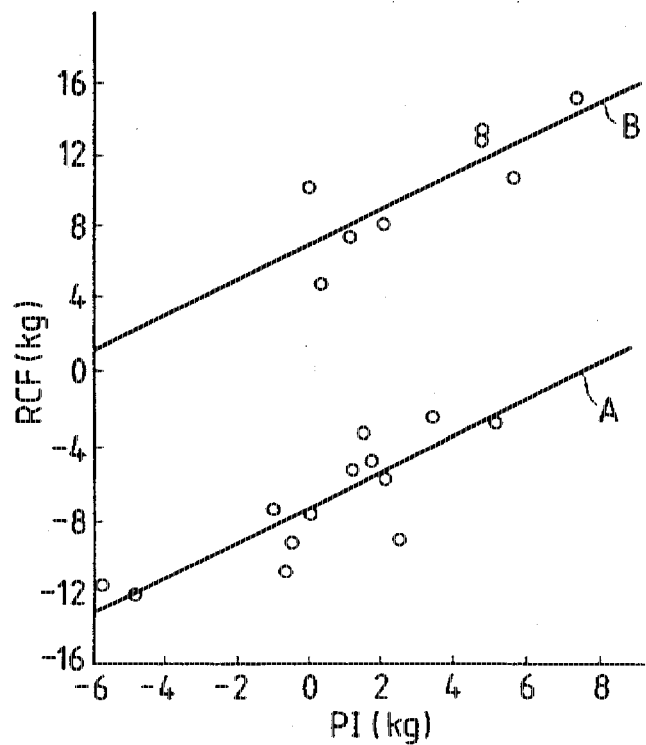
FIG. 2 is a graph illustrating the relationship between residual cornering force (RCF) and pattern index (PI).

FIG. 2 is a graph plotting the residual cornering force RCF against various values of the pattern index PI. Straight line A in the graph refers to a tire sample in which breaker cords embedded in the tire tread are arranged in the normal direction whereas straight line B refers to a tire sample in which breaker cords are arranged in a reverse direction which is symmetric to the normal direction with respect to the direction of tire revolution. As seen from the graph, the change in the direction of arrangement of breaker cords causes a difference in the range of between 14 to 15 kg in the residual cornering force RCF.

In accordance with the present invention, the pattern index PI of the tire to be mounted on a vehicle weighing M (kg) is controlled to satisfy the following condition:

$$0.9 \leq (60 \cdot PI + 900)/M \leq 1.1$$

If M is 800 kg, PI should be within the range of between −3 (inclusive) to −0.3 (inclusive) in order to satisfy this condition. If M is 1200 kg, $3 \leq PI \leq 7$.

Four tire samples were prepared in accordance with the present invention and at the same time four comparative samples were prepared adopting a conventional structure. These samples were mounted on a vehicle that was subjected to a "skew test", in which the vehicle ran on a flat road at a speed of 80 km/h over a distance of 100 m where the amount by which the vehicle deviated either to the right or left from a straight line was measured. The results are shown below in Table 1 (for the samples of the present invention) and Table 2 (for comparative samples).

TABLE 1

| Sample No. | 1 | 2 | 3 | 4 |
|---|---|---|---|---|
| Tire size | 155/70R13 | 155/70R13 | 185/70R13 | 185/70R13 |
| Vehicle weight | 820 | 820 | 1160 | 1160 |
| PI | −2.0 | 0.0 | 3.0 | 6.0 |
| (60 · PI + 900)/M | 0.95 | 1.10 | 0.93 | 1.09 |
| Skew (R: right L: left) | L 0.2 | R 0.3 | L 0.3 | R 0.3 |

TABLE 2

| Sample No. | 1 | 2 | 3 | 4 |
|---|---|---|---|---|
| Tire size | 155/70R13 | 155/70R13 | 185/70R13 | 185/70R13 |
| Vehicle Weight | 820 | 820 | 1160 | 1160 |
| PI | −4.0 | 2.0 | 0.0 | 9.0 |
| (60 · PI + 900)/M | 0.80 | 1.24 | 0.78 | 1.24 |
| Skew (R: right L: left) | L 1.8 | R 2.0 | L 2.2 | R 2.1 |

As seen from Tables 1 and 2, the possible skew of a vehicle can be reduced by selecting tires that have PI values satisfying the condition $0.9 \leq (60 \cdot PI + 900)/M \leq 1.1$. Thus, a vehicle can travel straight in a stable manner not only on a flat road but also on a non-flat road that slopes toward either edge in a direction that crosses the direction in which the vehicle travels.

In its second aspect, the present invention provides a method for selecting a vehicle that weighs M (kg) which is equipped with a tire having a tread pattern whose pattern index PI as defined hereinabove satisfies the following relationship with respect to the vehicle weight M:

$$0.9 \leq (60 \cdot PI + 900)/M \leq 1.1.$$

In accordance with this second aspect, a vehicle is selected in such a way that its weight M satisfies the specified relationship with the pattern index PI of the tread pattern of the tire which is to be mounted on the vehicle; this insures improved maneuverability in running straight and the vehicle can travel on a sidewise sloping road in a stable manner while experiencing only limited "skew".

Having the structural features described hereinabove, the present invention offers the following advantages.

First, a tire may be selected for a vehicle in accordance with its weight such that the tire has a tread pattern with a pattern index PI that produces an inherent residual cornering force (RCF) for improving the vehicle's maneuverability in running straight along a sidewise sloping road while experiencing only limited "skew".

Alternatively, a vehicle may be selected for receiving a tire in such a way that its weight satisfies the specified relationship with the pattern index of the tread pattern that insures improved maneuverability in running straight on a sidewise sloping road in a stable manner while experiencing only limited "skew".

I claim:

1. A method comprising:

determining a vehicle weight M of a vehicle; and making a tire having a tread with a road contacting surface, the tread including a crown portion located adjacent to the tire equator, a shoulder portion located adjacent to an edge of the tread and a middle portion located between the shoulder portion and crown portion, the tread having a tread pattern, the tread pattern including axial grooves and sipes in each of the portions, wherein in said making step, said tread pattern of said tread is formed based on the vehicle weight M of the vehicle which is determined in said determining step such that said tread pattern of the tread has a pattern index PI which satisfies the following condition:

$$0.9 \leq (60 \cdot PI + 900)/M \leq 1.1$$
$$PI = (\Delta RCF_{CR} + \Delta RCF_{SH}) + (\Delta RCF_{CR1} + \Delta RCF_{SH1})$$

-continued $$\Delta RCF_{CR} = \sum_{i=0}^{m} (-0.020 \cdot m \cdot \alpha(i) \cdot \theta(i))$$

$$\Delta RCF_{SH} = \sum_{i=0}^{n} (0.047 \cdot n \cdot \beta(i) \cdot \delta(i))$$

$$\Delta RCF_{CR1} = \sum_{i=0}^{m_1} (-0.020 \cdot m_1 \cdot \alpha_1(i) \cdot \theta_1(i))$$

$$\Delta RCF_{SH1} = \sum_{i=0}^{n_1} (0.021 \cdot n_1 \cdot \beta_1(i) \cdot \delta_1(i))$$

where m: the total number of grooves in the crown portion of the road contacting surface of the tire;

n: the total number of grooves in the shoulder portion of the road contacting surface of the tire;

$\alpha$: the ratio of the axial length of a groove in the crown portion of the road contacting surface of the tire to the width of the crown portion;

$\Theta$: the angle the groove in the crown portion of the road contacting surface of the tire forms with the axial direction of the tire;

$\beta$: the ratio of the axial length of a groove in the shoulder portion of the road contacting surface of the tire to the width of the shoulder portion;

$\delta$: the angle the groove in the shoulder portion of the road contacting surface of the tire forms with the axial direction of the tire;

$m_1$: the total number of sipes in the crown portion of the road contacting surface of the tire;

$n_1$: the total number of sipes in the shoulder portion of the road contacting surface of the tire;

$\alpha_1$: the ratio of the axial length of a sipe in the crown portion of the road contacting surface of the tire to the width of the crown portion;

$\Theta_1$: the angle the sipe in the crown portion of the road contacting surface of the tire forms with the axial direction of the tire;

$\beta_1$: the ratio of the axial length of a sipe in the shoulder portion of the road contacting surface of the tire to the width of the shoulder portion; and $\delta_1$: the angle the sipe in the shoulder portion of the road contacting surface of the tire forms with the axial direction of the tire.

* * * * *